Dec. 16, 1930.   D. K. BLAKE   1,785,719
AUTOMATIC CONTROL SYSTEM
Filed Jan. 19, 1929
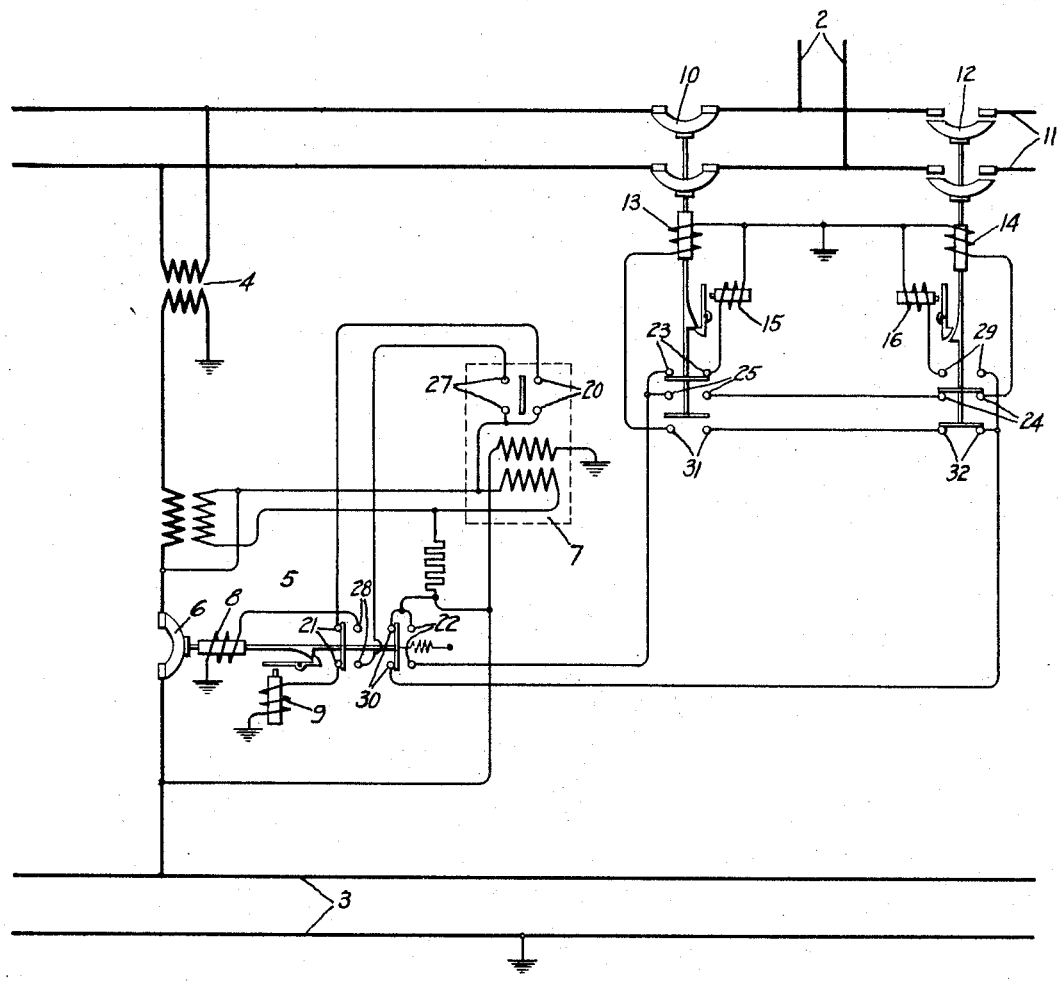
Inventor:
David. K. Blake,
by Charles E. Tullar
His Attorney.

Patented Dec. 16, 1930

1,785,719

UNITED STATES PATENT OFFICE

DAVID K. BLAKE, OF SCOTIA, NEW YORK, ASSIGNOR TO GENERAL ELECTRIC COMPANY, A CORPORATION OF NEW YORK

AUTOMATIC CONTROL SYSTEM

Application filed January 19, 1929. Serial No. 333,705.

My invention relates to automatic control systems and its object is to provide an improved arrangement for controlling the connection between load circuit and a main or preferred and an auxiliary source of current therefor.

My invention relates particularly to a system in which the preferred source is an alternating current feeder circuit which also supplies current to an alternating current network. In order to simplify the control equipment and maintain the cost thereof as low as possible, I provide, in accordance with my invention, an arrangement whereby the transfer of the load circuit from its preferred source to its auxiliary source and vice versa is controlled by the position of the circuit breaker between the feeder circuit and the network.

My invention will be better understood from the following description when taken in connection with the accompanying drawing which is a diagrammatic showing of an electric system embodying my invention and its scope will be pointed out in the appended claims.

Referring to the drawing, 1 represents a supply circuit such as an alternating current feeder circuit which is normally arranged to supply current to a plurality of load circuits such as the load circuit 2 and the alternating current network 3. Interposed between the feeder circuit 1 and the network 3 is a step-down transformer 4 the primary of which is connected across the feeder circuit and the secondary of which is arranged to be connected to and disconnected from the network by means of a suitable network protector 5, examples of which are well known in the art. As shown in the drawing, the network protector includes a circuit breaker 6 for connecting or disconnecting the transformer secondary and the network and a relay 7 which is connected and arranged in any suitable manner, examples of which are well known in the art, so that it effects the opening of the circuit breaker 6 in response to the flow of energy from the network to the transformer secondary and the closing of the circuit breaker 6 in response to a predetermined relation between the secondary voltage of the transformer 4 and the network voltage. The circuit breaker 6, which may be of any suitable type, is shown in the drawing as a latched-in circuit breaker and is provided with a closing coil 8 and a trip coil 9.

The load circuit 2 is normally connected to the feeder circuit 1 by means of a suitable circuit breaker 10. In order that the load circuit 2 may be supplied with energy when the feeder circuit 1 is deenergized, I provide a suitable auxiliary source of current 11 which is arranged to be connected to the load circuit 2 by means of a circuit breaker 12.

In accordance with my invention, I control the operation of the circuit breakers 10 and 12 in response to the operation of the network protector 5 so that the circuit breaker 10 is opened and the circuit breaker 12 is closed in response to the opening of the circuit breaker 6 and the circuit breaker 12 is opened and the circuit breaker 10 is closed in response to the closing of the circuit breaker 6.

The circuit breakers 10 and 12 may be of any suitable type, examples of which are well known in the art. In the drawing they are shown as latched-in circuit breakers and are respectively provided with the closing coils 13 and 14 and the trip coils 15 and 16.

The operation of the arrangement shown in the drawing is as follows:

Under normal operating conditions, the circuit breakers 6 and 10 are closed so that the feeder circuit 1 supplies current to the load circuit 2 and to the network 3. When the feeder circuit 1 is deenergized by being disconnected from its source or a fault occurs thereon or any other abnormal condition occurs which causes reverse power to flow from the network 3 to the transformer 4, the network relay 7 closes its contacts 20 and completes through the auxiliary contacts 21 on the circuit breaker 6 an energizing circuit for the trip coil 9 so as to effect the opening of the circuit breaker 6. When the circuit breaker 6 opens, the closing of its auxiliary contacts 22 completes, through the auxiliary contacts 23 on the circuit breaker 10 an energizing circuit for the trip coil 15 of the circuit breaker 10 so as to effect the opening thereof. As soon as the circuit breaker 10 opens, a circuit is completed for the closing coil 14 of the circuit breaker 12 to connect the load circuit 2 to the auxiliary source 11. The energizing circuit of the closing coil 14 includes the auxiliary contacts 24 on the circuit breaker 12, the auxiliary contacts 25 on the circuit breaker 10 and the auxiliary contacts 22 on the circuit breaker 6.

Therefore, it will be observed that whenever the network protector effects the disconnection of the transformer secondary from the network, the circuit breaker 10 is opened to disconnect the load circuit 2 from the feeder circuit 1 and the circuit breaker 12 is closed to effect the connection of the load circuit 2 to the auxiliary source 11.

When the magnitude and phase of the transformer secondary voltage bears a proper relation to the magnitude and phase of the network voltage, the reclosing relay 7 closes its contacts 27 and thereby completes through the auxiliary contacts 28 on the circuit breaker 6, an energizing circuit for the closing coil 8 so as to effect the closing of the circuit breaker 6. When the circuit breaker 6 closes, it completes a circuit for the trip coil 16 of the circuit breaker 12 so as to effect the disconnection of the load circuit 2 from the auxiliary source 11. This energizing circuit of the trip coil 16 includes the auxiliary contacts 29 on the circuit breaker 12 and the auxiliary contacts 30 on the circuit breaker 6. As soon as the circuit breaker 12 opens, a circuit is completed for the closing coil 13 of the circuit breaker 10 so as to effect the connection of the load circuit 2 to the feeder circuit 1. This circuit for the closing coil 13 includes the auxiliary contacts 31 on the circuit breaker 10, the auxiliary contacts 32 on the circuit breaker 12 and the auxiliary contacts 30 on the circuit breaker 6.

Therefore, it will be observed that when the network protector 5 effects the connection of the transformer secondary to the network, the circuit breaker 12 is opened to disconnect the load circuit 2 from the auxiliary source 11 and the circuit breaker 10 is closed to connect the load circuit to the preferred source 1.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States, is:

1. In combination, a supply circuit, two load circuits normally supplied therefrom, an auxiliary source, means responsive to the disconnection of one of said load circuits from said supply circuit for effecting the disconnection of the other load circuit from said supply circuit and the connection of said other load circuit to said auxiliary source, and means responsive to the connection of said one of said load circuits to said supply circuit for effecting the disconnection of said other load circuit from said auxiliary source and the connection of said other load circuit to said supply circuit.

2. In combination, a main supply circuit, an auxiliary supply circuit, two load circuits normally connected to said main supply circuit, a circuit breaker between one of said load circuits and said main supply circuit, a circuit breaker between the other load circuit and each of said supply circuits, means for controlling the opening and closing of the circuit breaker between said one of said load circuits and said main supply circuit, and means controlled by the position of said last mentioned circuit breaker for effecting the opening of the circuit breaker between said main supply circuit and said other load circuit and the closing of the circuit breaker between said other load circuit and said auxiliary supply circuit when the circuit breaker between the main supply circuit and said one of said load circuits is open and the opening of the circuit breaker between said auxiliary supply circuit and said other load circuit and the closing of the circuit breaker between said main supply circuit and said other load circuit when the circuit breaker between said main supply circuit and said one of said load circuits is closed.

3. In combination, a feeder circuit, a network, a load circuit, an auxiliary supply circuit for said load circuit, a circuit breaker between said feeder circuit and network, a circuit breaker between said feeder and load circuits, a circuit breaker between said supply and load circuits, means for controlling the opening and closing of the circuit breaker between said feeder circuit and network, and means controlled by the position of said circuit breaker between said feeder circuit and network for effecting the opening of the circuit breaker between the feeder and load circuits and the closing of the circuit breaker between the auxiliary supply and load circuits when said circuit breaker between said feeder circuit and network is opened and for effecting the opening of the circuit breaker between the auxiliary supply and load circuits and the closing of the circuit breaker between said feeder and load circuits when said circuit breaker between said feeder circuit and network is closed.

4. In combination, an alternating current feeder circuit, a transformer having its primary connected to said feeder circuit, an alternating current network, a network protector for controlling the connection between the secondary of said transformer and said network, a load circuit normally connected to said feeder circuit, an auxiliary supply circuit normally disconnected from said load circuit, and means controlled by said network protector for transferring said load circuit from said feeder circuit to said auxiliary supply circuit when said protector effects the disconnection of the transformer secondary from the network and for transferring said load circuit back to said feeder circuit when said protector effects the connection of said transformer secondary to said network.

In witness whereof, I have hereunto set my hand this 18th day of January, 1929.

DAVID K. BLAKE.